United States Patent
Brenner et al.

(10) Patent No.: US 6,971,183 B2
(45) Date of Patent: Dec. 6, 2005

(54) PROBE HEAD FOR COORDINATE MEASURING MACHINES

(75) Inventors: Kurt Brenner, Satteldorf (DE); Eckhard Enderle, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 10/921,215

(22) Filed: Aug. 18, 2004

(65) Prior Publication Data

US 2005/0055839 A1 Mar. 17, 2005

Related U.S. Application Data

(63) Continuation of application No. PCT/EP03/00472, filed on Jan. 18, 2003.

(30) Foreign Application Priority Data

Feb. 28, 2002 (DE) ............... 102 09 775
Jul. 15, 2002 (DE) ............... 102 32 349

(51) Int. Cl.⁷ ............................................ G01B 5/012
(52) U.S. Cl. ............................................ 33/559; 33/503
(58) Field of Search ............... 33/503, 556, 558, 33/559, 561

(56) References Cited

U.S. PATENT DOCUMENTS

| | | | |
|---|---|---|---|
| 3,766,653 A | 10/1973 | McKay, Sr. | |
| 4,203,225 A * | 5/1980 | Nilsson | 33/561 |
| 4,509,263 A | 4/1985 | Andrie et al. | |
| 4,805,314 A * | 2/1989 | Hayashi et al. | 33/503 |
| 4,899,456 A * | 2/1990 | Morita et al. | 33/561 |
| 4,961,267 A * | 10/1990 | Herzog | 33/503 |
| 5,130,523 A * | 7/1992 | Raleigh et al. | 33/503 |
| 5,299,360 A * | 4/1994 | Possati et al. | 33/559 |
| 5,339,531 A * | 8/1994 | Ogiwara | 33/503 |
| 5,724,745 A * | 3/1998 | Brenner et al. | 33/503 |
| 5,727,326 A | 3/1998 | Mies et al. | |
| 5,839,202 A * | 11/1998 | Tezuka et al. | 33/503 |
| 5,979,070 A * | 11/1999 | Lau | 33/559 |
| 6,307,084 B1 * | 10/2001 | Matsuki et al. | 33/503 |
| 6,397,485 B1 * | 6/2002 | McMurtry | 33/503 |
| 2004/0168332 A1 * | 9/2004 | Hama et al. | 33/551 |

FOREIGN PATENT DOCUMENTS

| | | |
|---|---|---|
| DE | 24 40 692 | 4/1975 |
| DE | 37 25 207 A1 | 2/1989 |
| DE | 195 01 178 C2 | 6/1995 |
| DE | 195 00 451 A1 | 9/1995 |
| DE | 196 47 514 C2 | 5/1998 |
| EP | 0 548 328 B1 | 6/1993 |
| WO | 00/08414 | 2/2000 |

* cited by examiner

*Primary Examiner*—G. Bradley Bennett
(74) *Attorney, Agent, or Firm*—Harness, Dickey & Pierce, P.L.C.

(57) ABSTRACT

A probe head for a coordinate measuring machine has a feeler device that can be deflected in space. Also provided are balancing element for adjusting a predetermined rest position of the feeler device for any different alignment of the probe head in space. The balancing element are designed as masses. The forces or moments required for balancing the feeler device are produced by the masses.

18 Claims, 7 Drawing Sheets

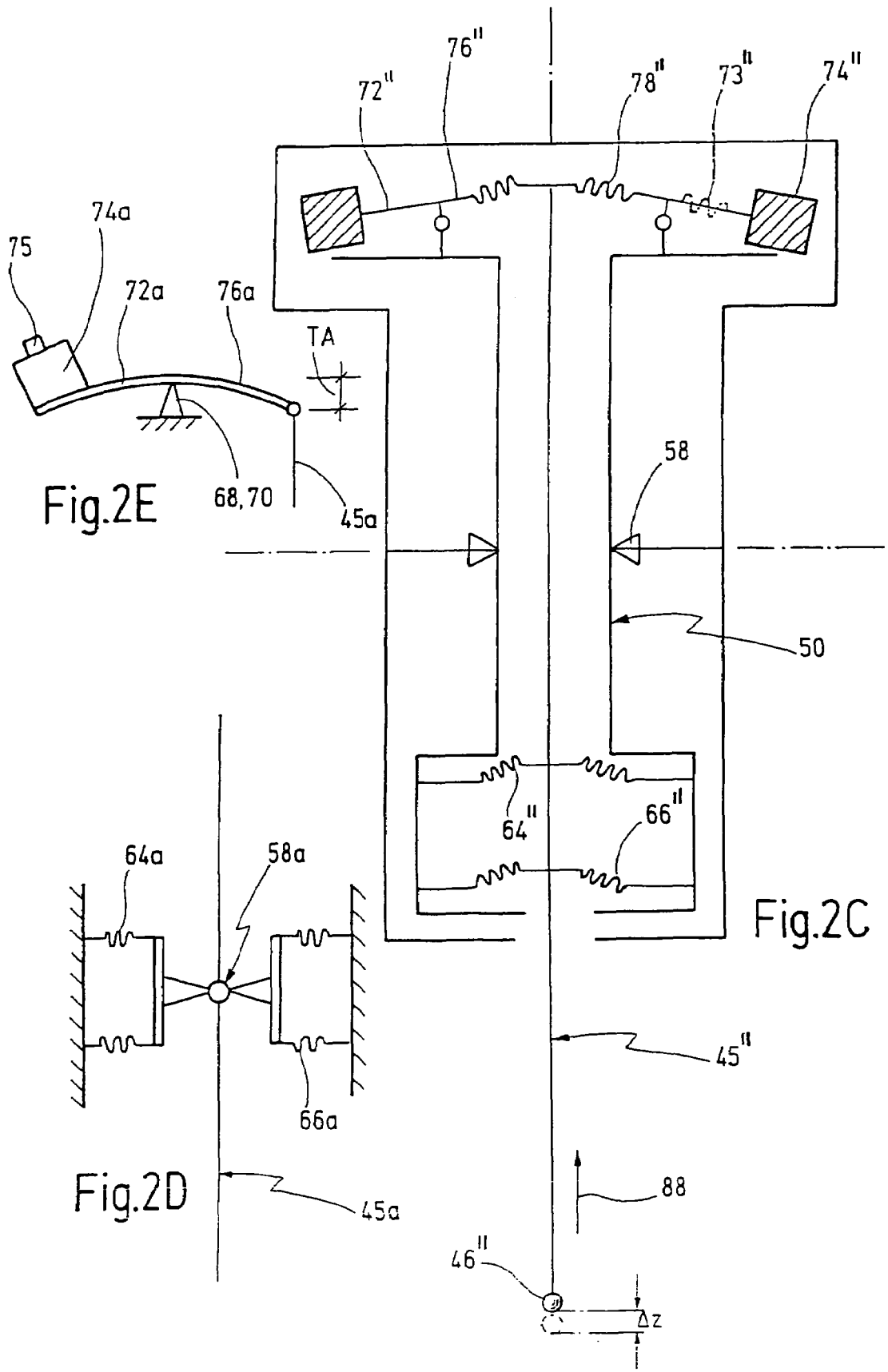

PROBE HEAD FOR COORDINATE MEASURING MACHINES

CROSS-REFERENCE TO OTHER APPLICATIONS

The present application is a continuation of pending international patent application PCT/EP03/00472, filed Jan. 18, 2003 which designates the United States and was published in German, which claims priority of German Patent Application No. 102 09 775.5, filed Feb. 28, 2002 and German Patent Application No. 102 32 349.6, filed Jul. 15, 2002.

BACKGROUND OF THE INVENTION

The invention relates to a probe head for a coordinate measuring machine, and in particular to a probe head having a feeler device for touching a workpiece to be measured.

Probe heads of the type of interest are typically used in coordinate measuring machines for continuously scanning three-dimensionally curved surfaces of a workpiece. There are two basic designs, namely probe heads having an active generation of measuring forces on the one hand, and passive probe heads on the other.

For probe heads with active generation of measuring force, the measuring force can be produced by means of force generators via the so-called probe head kinematics, i.e. the units allowing to move the feeler device along the axes of a Cartesian coordinate system. Here, the measuring force is the force with which a tip of the feeler device is pressed against the workpiece to be measured. For example, the force is applied electromagnetically via appropriate measuring force coils.

During the measuring operation, tracking may be undertaken in the coordinate measuring machine in such a way that the probe head kinematics is kept approximately in a zero position.

With such active probe heads, very small measuring forces can be applied. During acceleration of the coordinate measuring machine, the mass of the probe head kinematics can be actively held by means of the force generators. Moreover, active probe heads can be deflected in advance before contact with the workpiece surface. A larger reaction path for the coordinate measuring machine is thereby gained, and it is possible to make contact at higher speeds.

Active probe heads basically allow an active balancing of the feeler device by means of which the probe head kinematics can be reset to the zero position upon pivoting or rotation of the probe head in space. The feeler device of the probe head is thus kept in a stable equilibrium. No measuring path is lost during pivoting owing to such a balancing.

However, in the case of passive probe heads the magnitude of the measuring forces is produced by the spring stiffness and the deflection of the probe head kinematics. In order to implement small measuring forces, either the probe head kinematics must be soft, or the deflection paths must be small. However, small deflection paths create great demands on the control of the coordinate measuring machine and do not permit high contact speeds. Large deflection paths are thus advantageous, but require soft spring kinematics so that the measuring forces and their fluctuation do not become excessively large.

However, in order to keep the losses in measuring range as low as possible, the moving mass of the kinematics should be small and the stiffness should be high. This contradicts the requirements set forth above.

Due to these problems, it is mainly passive probe heads that are addressed by the present invention which, however, is not strictly restricted thereto.

Passive probe heads typically have no balancing. Thus, if such probe heads are pivoted or rotated into a specific position, their feeler device is also deflected from its stable zero position. This reduces the active measuring path by the amount of the deflection.

WO 00/08414 discloses a passive probe head for three-dimensional measurements on workpieces. A rear region of the stylus of this known probe head is constructed in a spherical fashion, the spherical region being held in a ring bearing of complementary spherical construction. Thus, the stylus can be moved along two mutually orthogonal axes, but not on the third axis, perpendicular thereto. In order to permit movement along the third axis, the ring bearing is connected to an arm that is connected to the housing via a spring extending along the third axis.

There are provided two sensors between the arm and the rear end of the stylus supported by ball bearings, by means of which sensors it is possible to detect a tilting movement of the stylus along two of the three axes. A third sensor is provided between the arm and the housing in order to detect the movement of the arm, and thus also of the stylus, along the third axis.

In the configuration disclosed, the known probe head is only suitable for an installation position in which the housing is stationary, with only a pivoting movement of the feeler stylus in the ball bearing and a vertical movement of the arm being possible. During pivoting of the entire probe head, the arrangement would, by contrast, come out of the balance, since it is not counterbalanced. Measuring errors would therefore already occur when the vertical guide surface for the arm would be inclined, because the spring would then be differently loaded as in the case of a vertical installation.

The feeler stylus mounted in the ball bearing is also exposed to restoring forces during a deflection from the vertical position, because the feeler stylus is of asymmetric design relative to the center of the ball bearing.

DE 24 40 692 B1 discloses a three-coordinate position pickup. This pickup includes a stylus that is fastened in the middle of a membrane spring, and projects from the latter on one side with a measuring pin, and on the other side with a sensor system. The membrane spring is held in a tubular housing at its periphery. Here, the membrane spring permits movement of the measuring pin in all three coordinate directions, i.e. including the axial direction. The sensor system comprises three ferrite cores that are arranged along three axes of a Cartesian coordinate system and are surrounded in each case by a coil system. Consequently, upon deflection of a sphere at the free end of the stylus, the ferrite cores are moved in a different way in their coil systems such that three measuring signals are generated that correspond to the movement of the probe sphere in three coordinate directions.

This known probe head is also not counterbalanced, and so a change in the installation or operating position of the probe head leads to measuring errors and/or to a deflection.

Another probe head for coordinate measuring machines is known from DE 37 25 207 A1. In order to enable use this probe head in a way independent of position, it is possible to switch in for each of the three axes a balancing device that comprises two springs whose spring force is set by means of a motor. For its part, the motor is controlled via a zero position indicator that is part of a position measuring system and is preferably of optoelectronic design.

This known probe head is therefore relatively complicated because in addition to a double spring arrangement for each of the spatial coordinates, it also requires an individual motorized adjustment in each case together with an associated control arrangement.

DE 195 00 451 A1 discloses another probe head for coordinate measuring machines in the case of which balancing by means of motorized balancing drives is likewise provided. The known probe head has geared motors that serve as positioners for balancing the probe head, i.e. the middle position of a probe sphere. An appropriate positioner is provided for each of the three degrees of freedom.

This arrangement is also relatively complicated and, above all, one of high weight because said positioners have a substantial intrinsic weight.

Finally, DE 196 47 514 C2 discloses a method for carrying out a measurement by means of a probe of a measuring probe head of a coordinate measuring machine. This known method also provides balancing along three spatial coordinates in order to be able to pivot the probe in any desired way in space. According to the method described, the displacements of the zero position of the probe are determined on the basis of various probe weights and various spatial positions of the probe head, and the measured values determined by means of the probe head are finally corrected by electronic signal processing.

By contrast to the two previously mentioned known probe heads with balancing by electric motor, this known method therefore uses an electronic balancing in the form of a signal correction.

The known method is therefore again relatively complicated, since accurate sensor systems that cooperate with correspondingly complicated data processing must be provided for deviations from the zero position.

SUMMARY OF THE INVENTION

In view of this background, it is an object of the invention to provide a probe head which allows to avoid the above disadvantages. In particular, it is an object to provide a probe head that is balanced such that the probe head can be used with high precision in any installation and operating position.

According to one aspect of the invention, this object is achieved when at least one balancing element is used which is designed as a mass, and the forces and/or moments required for balancing the feeler device are produced by weight forces of the mass.

Accordingly, for balancing purposes use is made of mass forces, i.e. forces that are produced by masses inherent to the system or by specially provided as balancing masses. By means of a skillful design it is then possible to achieve self-balancing that requires no electric motor positioners, no sensor system and no data processing for balancing purposes. The invention therefore makes available a very simple, but very effective means that can be used in practice with low costs.

According to one preferred aspect, balancing is effected by a predetermined spatial distribution of masses. This applies, in particular, when the feeler device is cardanically mounted at its centroid.

This measure has the advantage that the feeler remains in its rest position once it has been assumed, independently of the orientation of the probe head in space, since the moments exerted by the individual masses of the feeler device via their weight forces compensate one another.

In a preferred development of this exemplary embodiment, the feeler is cardanically mounted for deflection along only two of three axes and, furthermore, a spring is provided for deflection along the third axis.

In a preferred embodiment, this is implemented in practice by virtue of the fact that the feeler device has a housing, in that a measuring stylus extending to a tip is arranged in the housing, in that the measuring stylus is supported relative to the housing via a spring, and in that the housing is cardanically mounted.

This measure has the advantage that the cardanic suspension acts "from outside" on a housing of the probe head, whereas the spring system for deflection along the third axis acts only inside the housing on the measuring stylus located there, i.e. on a substantially smaller mass.

In embodiments, the spring is designed as a membrane spring.

A particularly elegant design is achieved in this case by the membrane spring being arranged in a preferably pot-like portion of a housing of the feeler device between the housing and a stylus extending in a rest position along a housing axis.

This measure has the advantage that it is once again sufficient to move only a stylus of relatively small mass that is held in the elastic membrane.

A particularly good effect is achieved in this case by virtue of the fact that two membrane springs are provided at an axial spacing from one another.

This measure has the advantage of preventing tilting of the measuring stylus, because the latter is held at two axially spaced-apart points of the membrane springs.

In a particularly preferred embodiment of the invention, the spring is arranged between the tip and the cardanic suspension.

This measure has the advantage that the masses to be moved are particularly small and can be restricted in practice to the mass of the measuring stylus and of the springs.

In a another preferred group of embodiments, balancing is effected by a predetermined movement of the masses. This applies, in particular, whenever individual masses are interconnected by an arrangement that effect an opposite movement of the individual masses during pivoting of the probe head in space.

These measures have the advantage that the position of the centroid of the feeler device is fixed in space by a desired oppositely directed movement of individual masses such that complete balancing takes place.

It goes without saying in this case that both said groups of exemplary embodiments, namely the specific distribution of the masses, on the one hand, and the specific three-dimensional movement of the masses, on the other hand, can either be used only for individual coordinate axes, directions, planes and the like, or else can be combined with one another in each case.

In further embodiments of the invention, the balancing element comprise a lever mechanism for moving the masses in opposite direction.

This measure has the advantage that the balancing element can be of mechanically simple construction and act independently of the installation position or operating position of the probe head.

This applies, in particular, whenever the lever mechanism comprises double-armed levers.

When, in a further refinement of this exemplary embodiment, at least one of the levers has an elastic region, the levers can thus assume optimum bending lines. In a further refinement, this permits the use of centrally supported rigid structures having elastic ends clamped by clamping elements.

In a particularly preferred embodiment, the lever mechanism is arranged between an outer counterweight and a measuring stylus extending in a rest position along a central axis of the feeler device.

This measure has the advantage of producing a particularly compact design. The arrangement of the counterweight at the periphery makes a large weight available in conjunction with a relatively small cross section.

It is preferred, furthermore, when the feeler device has a tubular housing that is provided with a radial flange on its top side, double-armed levers of the lever mechanism supporting one another centrally on the flange.

This measure also has the advantage of producing a particularly compact design, and the masses to be compensated can be optimally distributed.

In further embodiments of the invention, a mass pivoted by means of the lever mechanism is provided with an additional weight (bias weight), the additional weight being dimensioned such that a bending, occurring as a consequence of the weight of the mass, of a lever arm carrying this mass and/or of a bearing point carrying the lever arm is compensated.

This measure has the advantage that a specific form of residual error is also compensated, to be precise the so-called "balancing offset" that arises by virtue of the fact that additional changes in position of the masses occur in practice when either lever arms that are being used for desired movement of the masses bend as a consequence of the weight force of these masses, and/or bearing points that are active as carrying elements in this context experience a certain bending. The positional errors arising through these flexures can be compensated in a surprisingly simple way by providing the moving masses with a certain additional weight that undertakes the required positional correction via the active lever arm.

Finally, preference is further given to an exemplary embodiment in which the feeler device is cardanically mounted for deflection along only two of three axes and, furthermore, a spring is provided for deflection along the third axis, the balancing element having a counterweight that moves in the direction of the third axis in a fashion that is forcibly oppositely directed to the masses supported by the spring This measure has the advantage, already mentioned further above, that the desired movement of masses in space is used to balance one axis, while the balancing of the other two axes is essentially effected by a suitable distribution of the masses in space.

Further advantages follow from the description and the attached drawing.

It goes without saying that the features named above and those yet to be explained below can be used not only in the respectively specified combination, but also in other combinations or on their own, without departing from the scope of the present invention.

BRIEF DESCRIPTION OF THE FIGURES

Exemplary embodiments of the invention are illustrated in the drawing and explained in more detail in the following description. In the drawing:

FIG. 2C shows an illustration similar to FIGS. 2A and 2B, but for the probe head in a further, vertically deflected operating position;

FIG. 2D shows a highly diagrammatic illustration, similar to FIG. 2A, for an alternative cardanic suspension of a feeler device;

FIG. 2E shows an illustration for further explaining the relationships in FIG. 2C, with regard to a so-called balancing offset;

DESCRIPTION OF PREFERRED EMBODIMENTS

Figure 1:
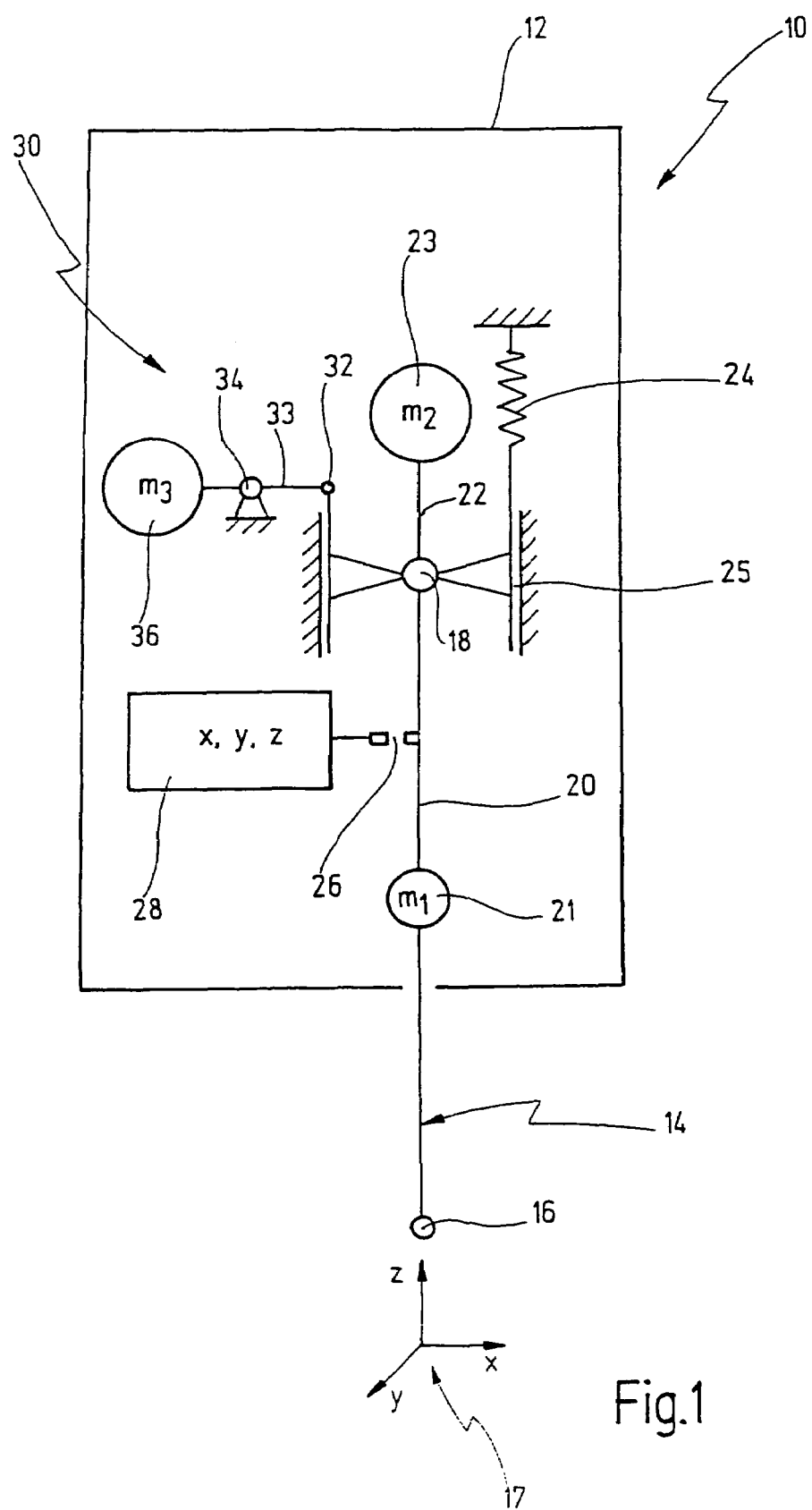
FIG. 1 schematically shows an illustration for explaining the principle of a probe head according to the invention.

A probe head for a coordinate measuring machine is denoted overall by 10 in FIG. 1. The probe head 10 comprises a housing 12, in which a feeler device 14 is located. A tip 16 is located at the free end of the feeler device 14. The feeler device 14 is suspended such that the tip 16 can move along the three axes x, y and z of a Cartesian coordinate system 17.

For this purpose, the feeler device 14 is suspended at one end in a bearing 18. The bearing 18 is a cardanic bearing, the term "cardanic" being understood in the present context to mean that the tip 16 can execute a movement in the x-y plane, whereas a movement in the z-direction is not possible.

The feeler device 14 is subdivided into a lower portion 20 below the bearing 18, the weight 21 of which is symbolized by a mass $m_1$, and an upper portion 22 above the bearing 18, the weight 23 of which is characterized by a mass $m_2$.

The arrangement is made in this case such that the centroid of the masses $m_1$ and $m_2$ is located exactly at the center of the bearing 18.

On the other hand, the feeler device 14 is guided, together with the bearing 18, in a guide 25 that is oriented in the z-direction. Also acting in this direction is a spring 24 that supports the bearing 18 together with the entire feeler device 14 against a mass, for example against the housing 12. Consequently, the feeler device 14 can also move in the z-direction via the spring 24.

A sensor system that cooperates with the feeler device 14 and whose movement in the x-, y- and z-directions is detected in a way familiar to the person skilled in the art is indicated by 26. The output signals of the sensor system 26 are fed to an electronic measuring unit 38 that uses the signals from the sensor system 26 to form appropriate signals for further processing of the measured values.

Finally, FIG. 1 also illustrates a balancing apparatus 30. The balancing apparatus 30 acts in the z-direction. It is symbolized in FIG. 1 by a lever arrangement in which a lever arm 33 acts at a joint 32 on the bearing 18 and leads via a bearing 34 fixed on a housing to a counterweight 36 whose mass is denoted in FIG. 1 by $m_3$.

The probe head 10 in FIG. 1 operates as follows: When the tip 16 is guided along a three-dimensionally curved surface of a workpiece to be measured, it can be deflected in the x-y plane because the cardanic bearing 18 permits this movement. A deflection in the z-direction is permitted via the support of the spring 24.

A deflection in the x-y plane is not accompanied by restoring forces in the feeler device 14 that are caused by gravitation, because the feeler device 14 lies with its centroid at the center of the bearing 18. The feeler device 14 is therefore located in equilibrium in each pivoted position.

The corresponding statement holds for a deflection in the z-direction, because a vertical movement of the total mass $m_1+m_2$ is compensated by means of the arrangement 32, 33, 34, acting as a rocker, by an oppositely directed movement of the mass $m_3$, which can be equal to the sum $m_1+m_2$, for example.

This also holds for the case in which the probe head 10 is pivoted or rotated as a whole, because both stabilization systems also work in an oblique operating position of the probe head 10.

It goes without saying here that the balancing apparatus 30, in particular, is illustrated only very schematically in FIG. 1. Within the scope of the invention, balancing apparatuses of every type are addressed here that act along one or more of the coordinate axes or in the case of the use of polar coordinates also in the direction of the pivoting angle, in order to effect balancing of the moving masses in the most general form. In reality, it is also possible to use other mechanisms than those shown in FIG. 1, which permits an oppositely directed movement of the masses $m_1$, $m_2$, on the one hand, and $m_3$, on the other hand, as will be shown below.

Figure 2A:
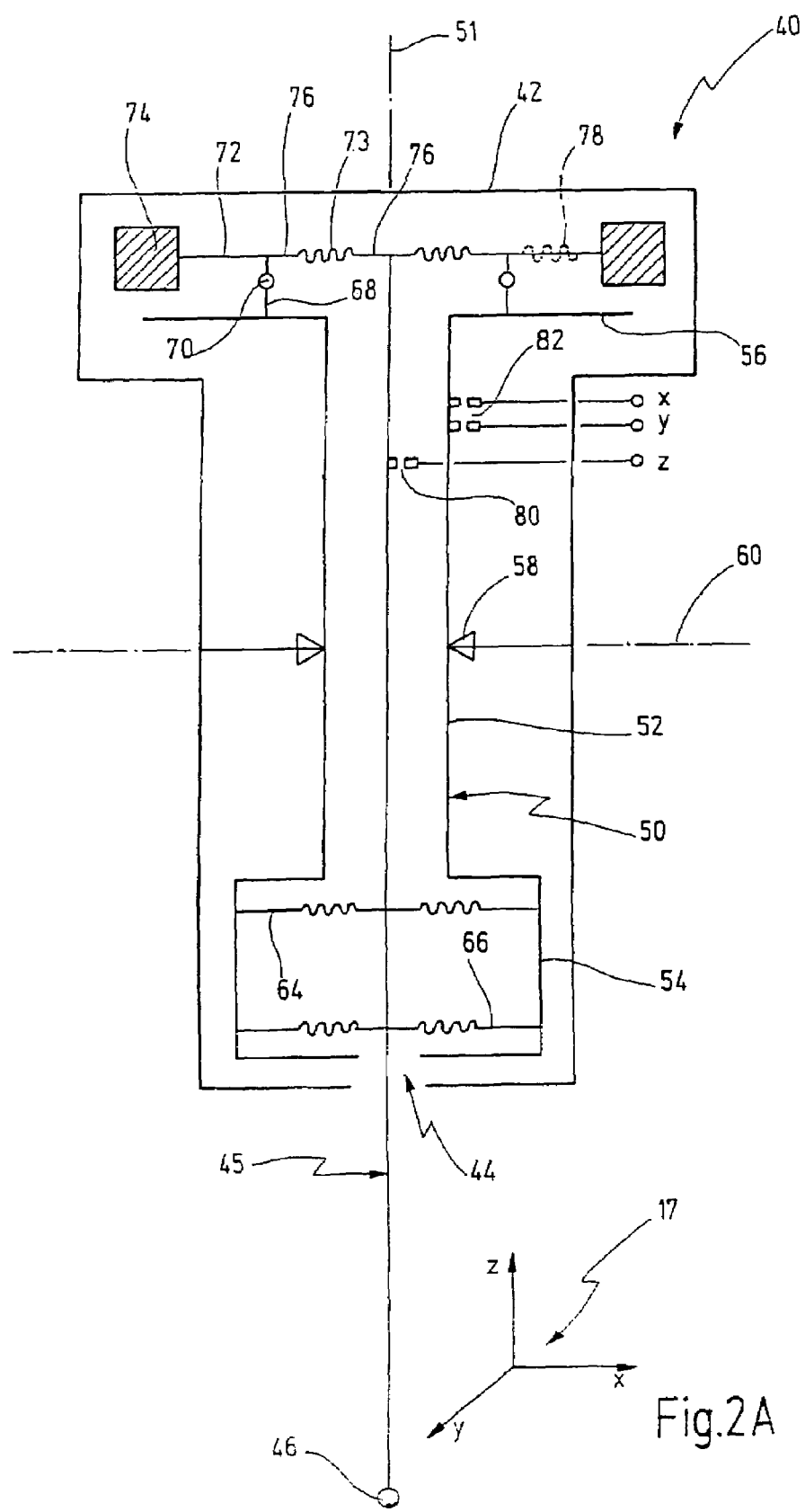
FIG. 2A shows a schematic illustration of a first exemplary embodiment of a probe head according to the invention, in rest position.
Figure 2B:
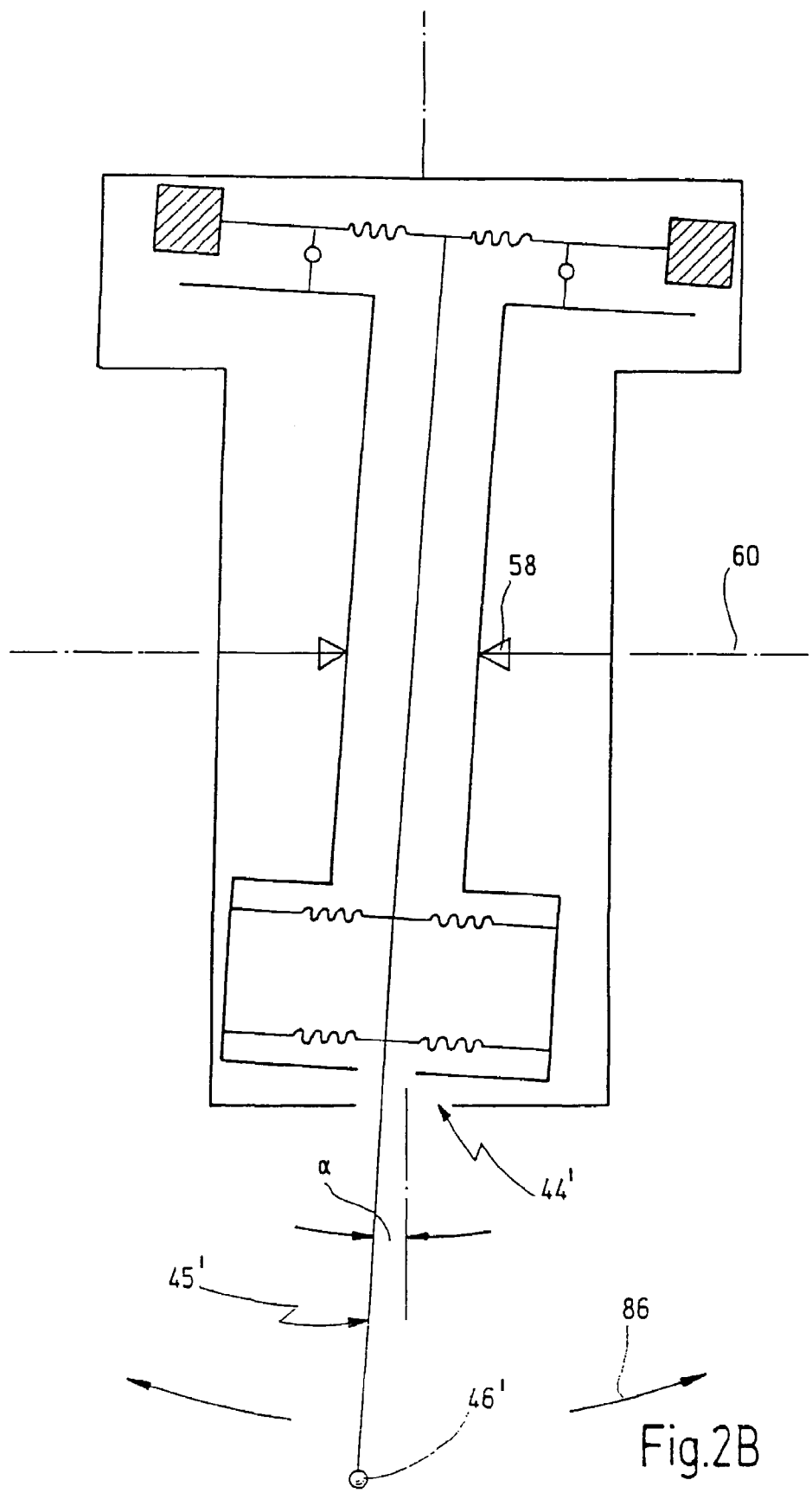
FIG. 2B shows an illustration, similar to FIG. 2A, but for the probe head in a first, laterally deflected operating position.
Figure 3A:
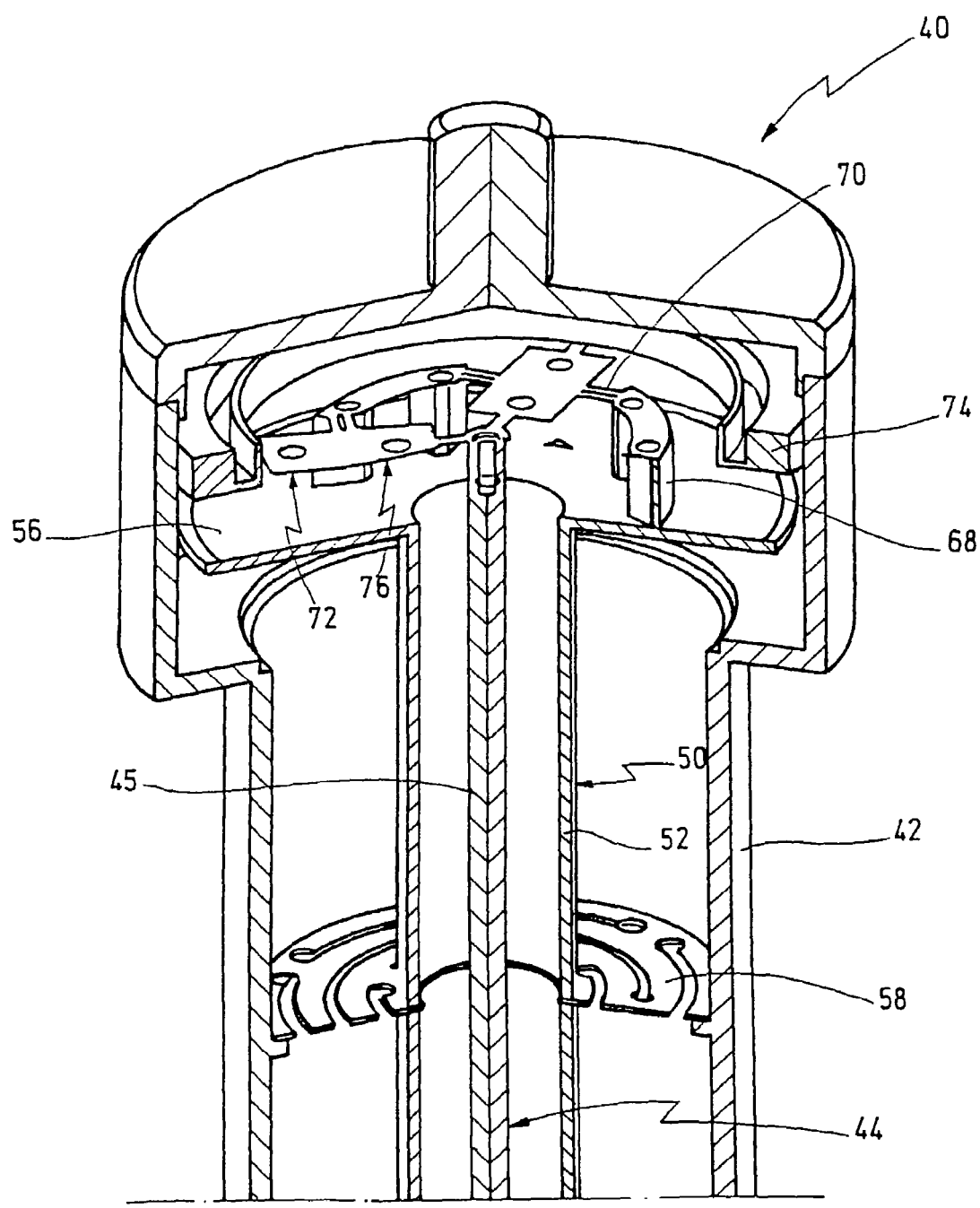
FIGS. 3A and 3B show a perspective illustration, partially cut away, of a practical implementation of the feeler device in accordance with FIG. 2A, illustrated in two halves.
Figure 3B:
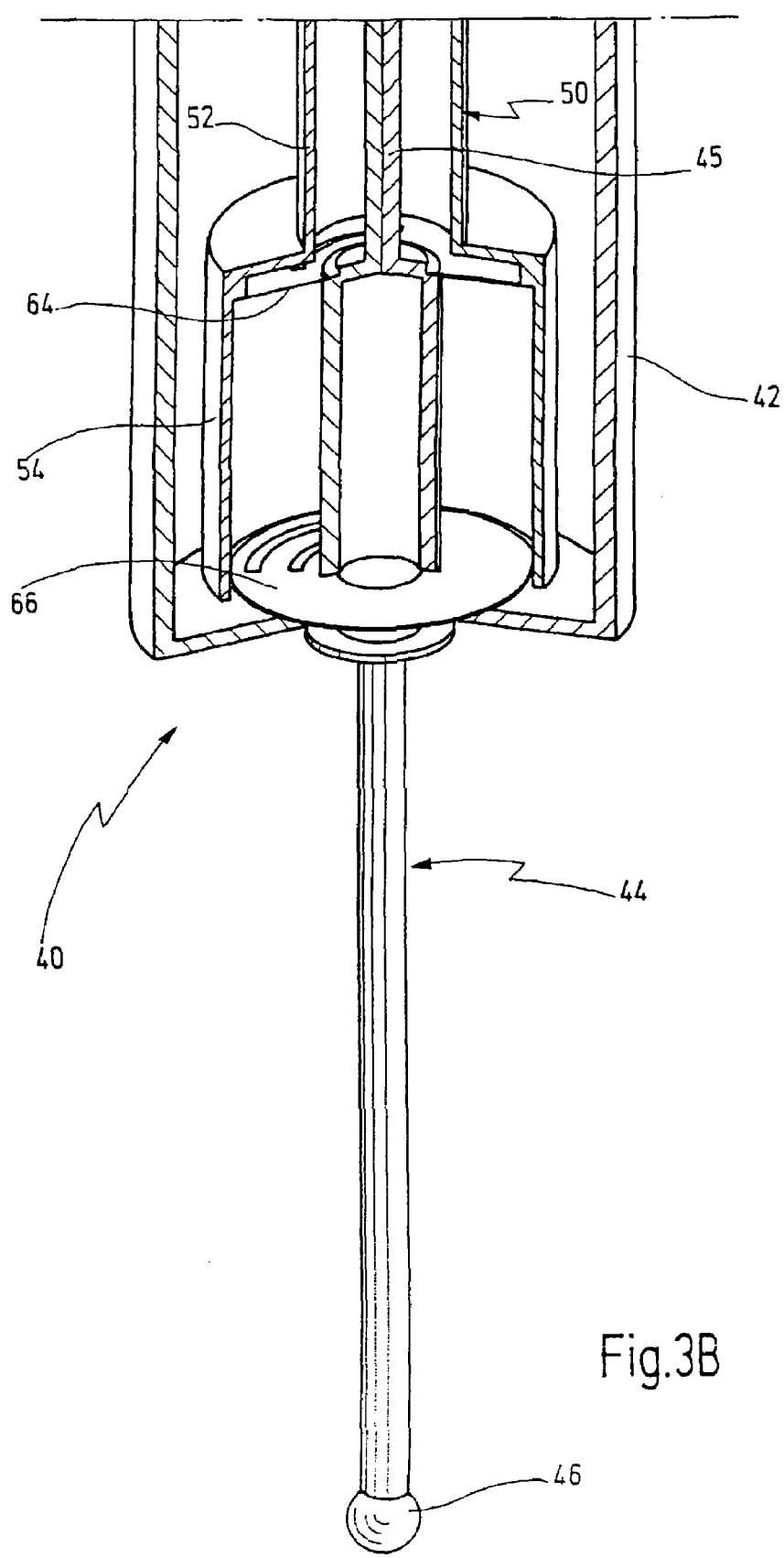
Figure 4A:
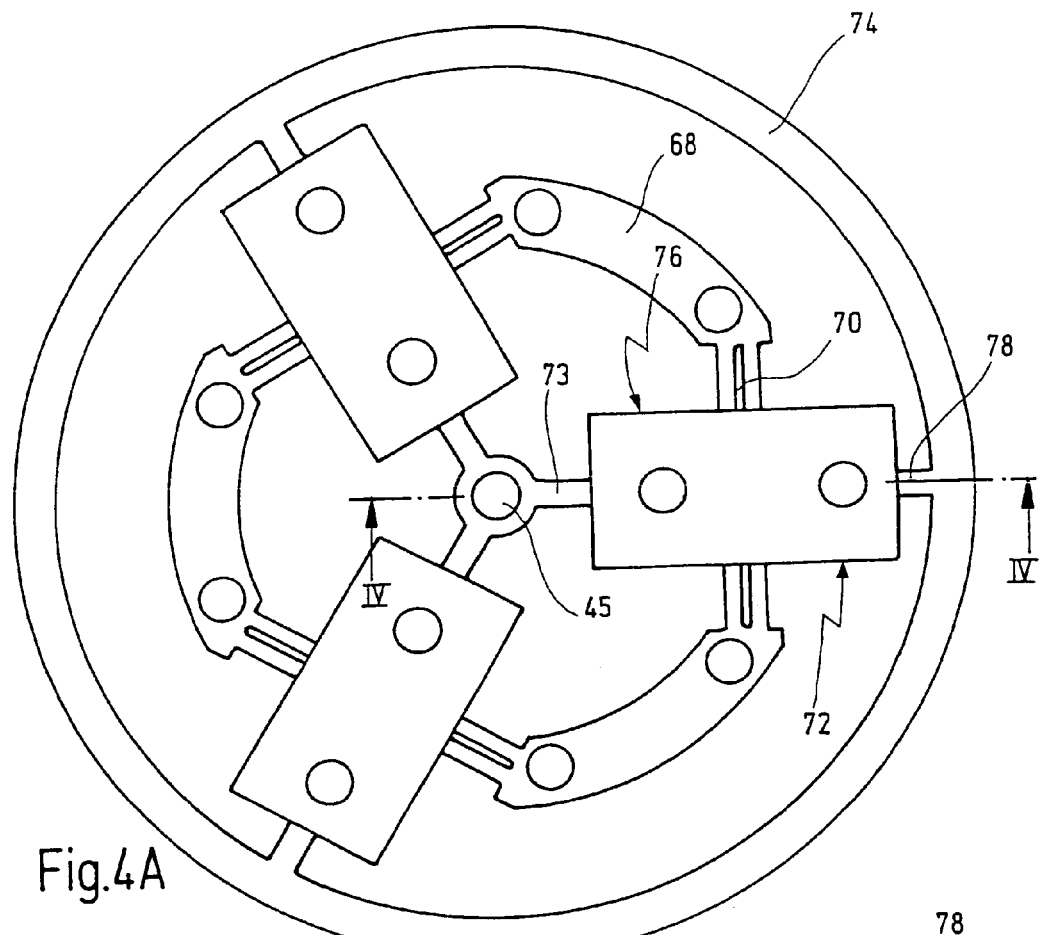
FIG. 4A shows a plan view of a balancing system such as is used with the feeler device in accordance with FIGS. 3A and 3B.

A further exemplary embodiment of a probe head 40 according to the invention is schematically illustrated in FIGS. 2A to 2C as well as in a practical embodiment in FIGS. 3A and 3B, FIG. 4 showing a further detail from FIG. 3A on an enlarged scale. Consequently, identical elements are provided in FIGS. 2 to 4 with identical reference numerals, different operating positions being denoted in each case by the addition of a prime or double prime.

Overall, 40 denotes the probe head, which has a housing 42. A feeler device 44 is seated in the housing 42. The feeler device 44 is substantially of tubular shape. A measuring stylus 45 whose lower tip 46 is constructed as a ball extends along a central axis 51 of the feeler device 44. Here, as well, it is possible for the tip 46 to move along the three axes x, y and z of a Cartesian coordinate system 47.

The feeler device 44 is provided with a tubular housing 50. This housing 50 includes a middle portion 52, a lower housing portion 54 and a radial flange 56 attached at the top to the middle portion 52.

Approximately in the middle of the middle, tubular portion 52, the feeler device 44 is supported in a cardanic bearing 58 relative to the housing 42 of the probe head 40. The cardanic bearing 58 is located in a plane 60 that approximately constitutes a radial middle plane of the probe head 40.

The measuring stylus 45 is held in the region of the housing portion 54 at the center of two axially spaced-apart membrane springs 64 and 66 that are fixed on the housing portion 54 by their periphery. This arrangement permits a movement of the measuring stylus 45 only along the z-axis.

Extending upward on the radial flange 56 are axial supports 68 that can also be designed as a ring or as ring segments. These supports 68 carry on their top side joints 70 at which double-armed levers are elastically linked.

Extending radially outward from the joints 70 are first, rigid lever arms 72 that lead to a counterweight 74, preferably via a flexible region 78. The counterweight 74 is preferably constructed as a ring, as emerges clearly from FIG. 3A in particular.

Leading radially inward from the joints 70 are second, rigid lever arms 76 that lead to the upper end of the measuring stylus 45, preferably via flexible regions 73. The rigid lever arms 72 and 76 are preferably constructed as a common rigid plate (cf. FIGS. 4A to 4C).

Finally, 80 denotes a first sensor that detects the deflection of the measuring stylus 45 in the z-direction, while second sensors 82 measure the deflection of the tube 50 in the x- and y-directions.

The probe head 40 operates as follows: FIG. 2B shows a situation in which the ball at the tip 46' at the free end of the measuring stylus 45' has been tilted to the side, as indicated by an arrow 86. The consequence of this is a deflection in the x- and y-directions. The pivoting angle is denoted by α in this case.

As a consequence of the cardanic suspension in the bearing 58, a stable position of the pivoted feeler device 44' results here, as well, because the arrangement is made such that the masses of the feeler device 44' are equally distributed on both sides of the plane 60, and so the mass centroid of the feeler device 44' is located at the center of the cardanic bearing 58.

By contrast, FIG. 2C shows another operating position, in which the measuring stylus 45" has been deflected only in the z-direction, as indicated by an arrow 88. The deflection is denoted in this case by Δz in FIG. 2C.

Because the cardanic bearing 58 does not permit a movement of the housing 50 in the z-direction, the movement of the measuring stylus 45" in the z-direction is permitted by deformation of the membrane springs 64", 66". This is clearly to be seen in FIG. 2C.

In addition, the balancing apparatus provided at the upper end of the measuring stylus 45" is active in the operating state in accordance with FIG. 2C. Reference may also be made at this juncture to the fact that the balancing apparatuses illustrated in the figures are to be understood only as an example and schematically, while the present invention relates to all types of balancing apparatuses that are effective along coordinate directions or rotary angles.

Specifically, the measuring stylus 45" moving upward presses the inner end of the second lever arms 76" upward, as a result of which the outer end of the first lever arms 72" is pivoted downward, and so also is the counterweight 74". The counterweight 74 is moved in the opposite direction to the extent that the masses of the measuring stylus 45 are moved in the z-direction. The mass of the housing 50 plays no role in this case, since it is not deflected in the z-direction.

By way of explanation, FIG. 2D shows an alternative, in which identical reference numerals to those in FIGS. 2A to 2C were used, an "a" having been added to them in each case. FIG. 2D explains a possible other positioning of the springs 64a, 66a, specifically here between the cardanic bearing 58a and the housing wall, while in the case of the exemplary embodiment in accordance with FIGS. 2A to 2C the springs 64, 66 were located between the free end of the measuring stylus 45 and the cardanic bearing 58.

The last-named positioning has the advantage that the masses to be moved in the z-direction are minimal, specifically comprising only the mass of the measuring stylus 45 below the cardanic bearing 58.

By contrast, in the alternatively possible arrangement in accordance with FIG. 2D the cardanic bearing 58a itself also has to be moved. The solution in accordance with FIG. 2D is therefore to be recommended only when specific structural reasons indicate it is advisable to displace the springs from the position 64, 66 in FIGS. 2A to 2C into the position 64a, 66a in FIG. 2D.

In addition, FIG. 2E shows a further problem of detail, specifically the so-called "balancing offset". Identical elements are provided in FIG. 2E, as well, with identical reference numerals to those in FIGS. 2A to 2C, but likewise with the addition of an "a".

FIG. 2E illustrates the relationships in the region of the lever arms 72, 76, which in principle constitute a rigid bending beam that is mounted in the middle in the region of the support 68 and the joint 70. The counterweight 74a bends this bending beam 72a, 76a, as illustrated greatly exaggerated in FIG. 2E. This leads to a balancing offset TA in the form that the measuring stylus 45 is situated too low (z-direction) by the amount TA.

In order to prevent this, the counterweight 74a is therefore provided according to the invention with a small additional weight 75 that rotates the arrangement in accordance with FIG. 2E in the counterclockwise direction about the joint 70 such that the measuring stylus 45a is raised again precisely by the balancing offset TA.

A preferred embodiment of this balancing apparatus will become clear from FIGS. 3 and 4.

According thereto, three radial arms mutually offset by 120° and constructed as plates 72, 76 clamped at both ends by means of leaf springs proceed from the upper end of the measuring stylus 45. The outer end of the plates is fastened to the counterweight 74 by a leaf spring. Located at about half the length of the plates is the joint 70, which is likewise constructed as a thin leaf spring and leads to supports 68. The latter are constructed as ring segments.

The use of leaf springs as clamps for the levers 72, 76 constitutes an elegant implementation of the elastic regions 73 and 78, because the leaf springs can bend overall in the shape of S in the case of a deflection in accordance with FIG. 2C, that is to say run horizontally at their two ends in a different vertical position.

Figures 4B, 4C:
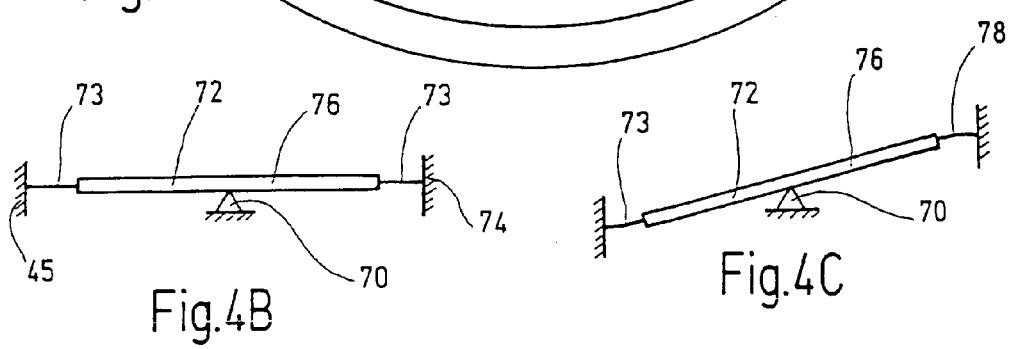
FIGS. 4B and 4C schematically show two sectional views along the line IV—IV in FIG. 4A for explaining the mode of operation of a joint shown there.

The conditions in the region of the levers 72, 76 (without taking account of the natural flexure in accordance with FIG. 2E) are illustrated extremely schematically in FIGS. 4B and 4C.

It is to be seen that the shape of the rigid levers 72 and 76 remains unchanged in relation to the elastic regions 73 and 78 when these rigid levers are pivoted about the bearing 70. By contrast, the elastic regions 73 and 78 assume the shape of a S overall.

These measures have the advantage that apart from the internal friction in the flexure of the elastic regions 73 and 78, no friction, in particular no sliding friction, occurs, and thus nor does any deleterious hysteresis in the present context.

It is preferred for the embodiment in accordance with FIG. 4 to be dimensioned in this case such that the double-armed levers 72, 76 acting as balance beams have an equal lever length on both sides. In this way, the balancing mass of the counterweight 74 can be selected to be exactly as large as the mass of the probe head kinematics, that is to say the parts of the probe head 40 moving in the z-direction.

The properties of this balancing apparatus are also maintained in the event of pivoting of the probe head 40 in space, and are thus active not only in a vertical operating position.

Overall, the present invention therefore provides a probe head that can be pivoted in its installation position without thereby loosing the stable position of the scanning elements.

Reduction in the measuring range that occurs with conventional probe heads as a consequence of positional errors owing to pivoting of the probe head is avoided according to the invention through the passive balancing outlined, or at least reduced to a minimum. This passive balancing is independent of the control and requires no additional signal lines in the multi-coordinate measuring machine. The selected kinematics design further permits an arrangement with a low dead weight, since the counterweight 74 acting as balancing mass can also be used for balancing in the cardan plane x-y (compare $m_2/m_1$ in FIG. 1).

What is claimed is:

1. A probe head for a coordinate measuring machine, the probe head being configured to be held in varying orientations in space, comprising:
   a feeler device having a predetermined rest position and being mounted in a way that allows a deflection of the feeler device from the predetermined rest position, and
   a plurality of masses as balancing elements for producing at least one of balancing forces and balancing moments for adjusting the predetermined rest position for the varying orientations of the probe head in space such that the feeler device remains in the predetermined rest position regardless of the orientation of the probe head in space,
   wherein the masses each have a weight, the weight producing the at least one of the balancing forces and balancing moments, and
   wherein the plurality of masses are spatially distributed for balancing the feeler device.

2. The probe head of claim 1, wherein the feeler device has a centroid and is cardanically mounted at its centroid.

3. The probe head of claim 1, the feeler device comprising a housing cardanically mounted with respect to a first and a second of three mutually orthogonal axes and comprising a stylus moveably arranged in the housing along a third of the three mutually orthogonal axes.

4. The probe head of claim 3, wherein the stylus is supported in the housing by a spring.

5. The probe head of claim 4, wherein the spring comprises at least one membrane spring.

6. The probe head of claim 5, wherein the spring comprises two membrane springs arranged in parallel to each other with a spacing from one another.

7. The probe head of claim 5, wherein the housing comprises a wall forming a pot-like portion, and wherein the at least one membrane spring is arranged in the pot-like portion between the wall and the stylus.

8. The probe head of claim 5, wherein the stylus comprises a free distal end and the housing comprises a cardanic suspension, the at least one membrane spring being arranged between the free distal and the cardanic suspension.

9. A probe head for a coordinate measuring machine, comprising
   a feeler device having a predetermined rest position and being mounted in a way that allows a deflection of the feeler device from the predetermined rest position, and
   at least one balancing element for producing at least one of balancing forces and balancing moments for adjusting the predetermined rest position for varying alignments of the probe head in space,
   wherein the at least one balancing element is designed as a mass having a weight, the weight producing the at least one of the balancing forces and balancing moments,
   wherein the feeler device is mounted for a deflection along each of three mutually orthogonal axes, wherein the feeler device is cardanically mounted for a deflection along two of the three axes, and wherein a spring is provided for a deflection of the feeler device along a third of the three axes, wherein the balancing element comprises a counterweight adapted to move in a direction parallel to the third axis and opposite to a deflection of the feeler device along the third axis.

10. The probe head of claim 9, wherein the spring is designed as a membrane spring.

11. A probe head for a coordinate measuring machine, comprising a feeler device having a predetermined rest position and being mounted in a way that allows a deflection of the feeler device from the predetermined rest position, and at least one balancing element for producing at least one of balancing forces and balancing moments for adjusting the predetermined rest position for varying alignments of the probe head in space, wherein the at least one balancing element is designed as a mass having a weight, the weight producing the at least one of the balancing forces and balancing moments, wherein the mass is configured to produce the at least one of the balancing forces and balancing moments by a predetermined movement which is oppositely directed to a movement of the feeler device.

12. A probe head for a coordinate measuring machine, comprising a feeler device having a predetermined rest position and being mounted in a way that allows a deflection of the feeler device from the predetermined rest position, and at least one balancing element for producing at least one of balancing forces and balancing moments for adjusting the predetermined rest position for varying alignments of the probe head in space, wherein the at least one balancing element comprises at least a first and a second mass which are interconnected such that a first movement of the first mass is accompanied by a second movement of the second mass, the first and second movements being oppositely directed to each other for balancing the feeler device at varying alignments of the probe head in space.

13. The probe head of claim 12, comprising a lever mechanism for interconnecting the first and second mass.

14. The probe head of claim 13, wherein the lever mechanism comprises double-armed levers.

15. The probe head of claim 14, wherein at least one of the levers has an elastic region.

16. The probe head of claim 15, wherein each lever is designed as rigid structure having two ends, wherein the rigid structure is moveably supported, and wherein each of the two ends has a flexible region clamped by a clamping element.

17. The probe head of claim 13, further comprising a measuring stylus and a counterweight, wherein the lever mechanism is arranged between the counterweight and the measuring stylus.

18. The probe head of claim 14, further comprising a bias weight for compensating a bending of the lever arms occurring as a consequence of the weight of the masses.

* * * * *